US00RE35234E

United States Patent [19]

Davis

[11] E Patent Number: Re. 35,234

[45] Reissued Date of Patent: May 14, 1996

[54] MODULAR AIR SCRUBBER SYSTEM

[75] Inventor: H. Forbes Davis, Tallevast, Fla.

[73] Assignee: Davis Water & Waste Industries, Inc., Tallevast, Fla.

[21] Appl. No.: 928,407

[22] Filed: Aug. 12, 1992

Related U.S. Patent Documents

Reissue of:

[64] Patent No.: 4,948,402
Issued: Aug. 14, 1990
Appl. No.: 281,746
Filed: Dec. 9, 1988

[51] Int. Cl.[6] ..... B01D 47/00

[52] U.S. Cl. ..... 55/233; 261/98

[58] Field of Search ..... 55/89, 90, 94, 55/95, 223, 229, 233; 261/22, 98, 117, 125, 146, 147; 95/187, 188, 211, 224

[56] References Cited

U.S. PATENT DOCUMENTS

| | | | |
|---|---|---|---|
| 973,120 | 10/1910 | Lloyd | 261/117 X |
| 1,657,822 | 1/1928 | Frechou | 210/196 |
| 1,790,975 | 2/1931 | Dallas et al. | 210/199 |
| 1,993,175 | 3/1935 | Libbey et al. | 210/798 |
| 2,585,440 | 2/1952 | Collins | 55/223 |
| 2,603,354 | 7/1952 | Way et al. | 210/747 |
| 2,716,489 | 8/1955 | Way | 210/140 |
| 2,879,893 | 3/1959 | Stebbins | 210/108 |
| 3,122,594 | 2/1964 | Kielback | 261/94 |
| 3,282,432 | 11/1966 | Greenleaf, Jr. | 210/264 |
| 3,312,348 | 4/1967 | Greenleaf, Jr. | 210/264 |
| 3,768,234 | 10/1973 | Hardison | 55/223 |
| 3,907,523 | 9/1975 | Melin | 95/224 |
| 3,936,281 | 2/1976 | Kurmeier | 95/211 |
| 4,039,307 | 8/1977 | Bondor | 261/125 X |
| 4,157,962 | 6/1979 | Huang et al. | 210/798 |
| 4,251,486 | 2/1981 | Sohda | 55/223 X |
| 4,588,535 | 5/1986 | Foidl | 55/223 X |
| 4,642,188 | 2/1987 | DeVisser et al. | 210/333.1 |
| 4,734,108 | 3/1988 | Cox et al. | 95/188 |

FOREIGN PATENT DOCUMENTS

| | | | |
|---|---|---|---|
| 0025116 | 4/1931 | Netherlands | 261/125 |

*Primary Examiner*—Richard L. Chiesa
*Attorney, Agent, or Firm*—Nixon & Vanderhye

[57] ABSTRACT

A modular air scrubber system is provided for removal of pollutants from air and includes a plurality of modular scrubbing towers adapted for side-by-side interconnection to provide multiple stage filtering of air to be treated, each tower having a lower reservoir portion for a scrubber solution, and an upper portion containing contact media, each modular tower also provided with air inlets outlets and scrubber solution inlets and outlets.

A specific arrangement of these modules adapted to accommodate a counterflow arrangement of air and scrubber solution for the removal of hydrogen sulfide from air is disclosed, in conjunction with a scrubber solution feed and control unit.

27 Claims, 4 Drawing Sheets

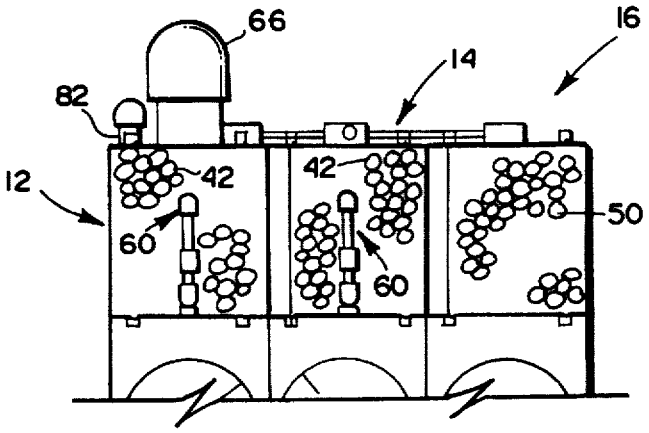
FIG. 7
FIG. 8
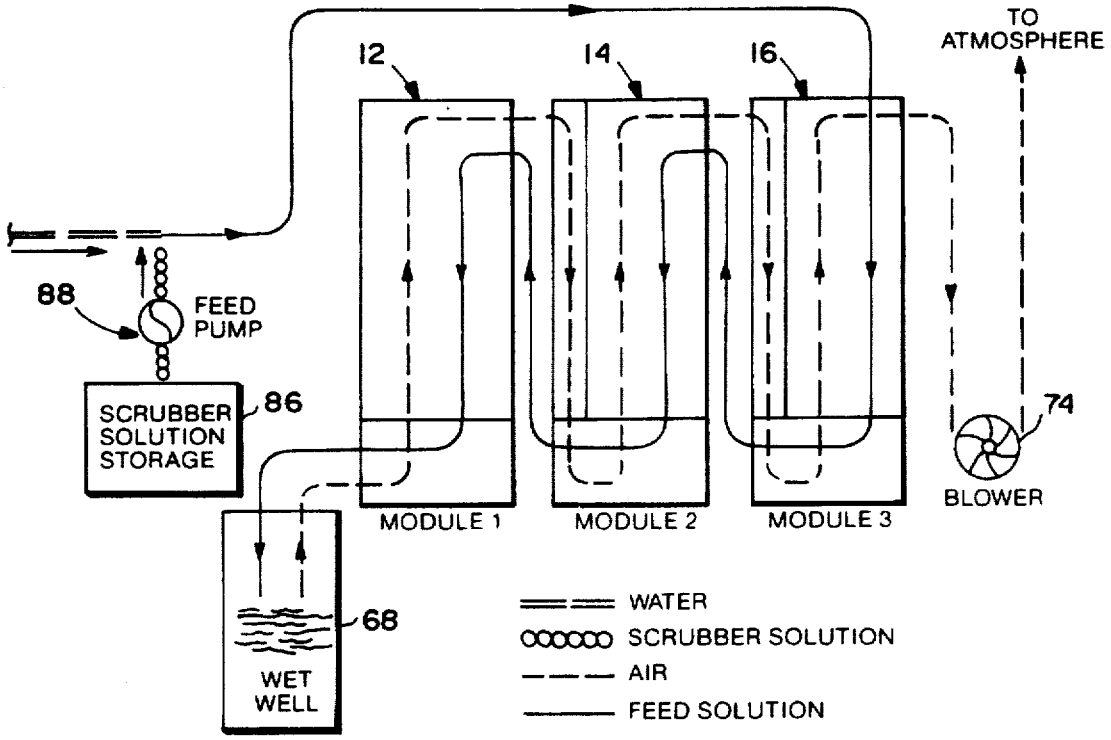

MODULAR AIR SCRUBBER SYSTEM

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to air scrubber systems in general, and in particular, to a multi-stage, modular air scrubber system which can be custom tailored to effectively handle many air treatment applications.

Currently, air scrubbers systems must be built from the ground up according to specifications for each job. Except for the obvious utilization of various common items of hardware, such as valves, pumps, filters and the like, there is no presently available air scrubber system which includes substantially complete modules which can be connected or disconnected to increase or decrease the scrubbing capacity of the system with minimal plumbing and hardware changes. As a result, modifications and/or change over from one job application to the other are often costly and time consuming.

It is therefore one object of the invention to provide a relatively simple and inexpensive modular design for multi-stage air scrubber units, facilitating addition and reduction of scrubber capacity, as well as changeover to other treatments with minimal expenditure of time and effort.

In one exemplary embodiment of this invention, the air scrubber system comprises at least three scrubbing modules or towers configured to remove hydrogen sulfide through counter current contact of contaminated air with an aqueous, alkaline scrubbing solution. Each scrubbing tower includes a substantially L-shaped housing, formed with an upper portion which includes a column packed with contact media, and a lower portion which includes liquid sump containing a scrubbing solution.

A liquid recirculation system is provided for each module which comprises a continuously operating submersible pump located in the lower portion of the tower, appropriate plumbing, and a spray discharge head comprising a plurality of nozzles for discharging scrubbing solution onto the contact media in the upper portion of the tower.

Access to the packed column is provided by way of a sealing lid mounted atop the scrubber unit, while access to the liquid sump section is provided by way of a removable cover located directly above the sump.

In one exemplary embodiment, where the modules are arranged for counterflow scrubbing of air, an air inlet is provided in the first of three modules, for supplying air from a wet well to the lower portion of the first module, but above the level of scrubbing solution. Apertures are also provided in the upper portions of adjacent, facing side walls of the modules which permits air to flow from the first to third modules in succession. The second and third modules are provided with partitions in their respective upper portions which create flow paths for the air between the upper and lower portions of these modules. The third module is also provided with an air outlet in its upper portion, leading to an outlet duct, air blower and exhaust stack.

In this same exemplary embodiment, a scrubber solution inlet is provided in the lower portion of the third inlet, and spillways are formed in the adjacent, facing walls of the lower portions of the second and third modules, while a scrubber solution drain is provided in the lower portion of the first module. Because the scrubber solution inlet, spillways and drain are at successively lower heights in the respective module walls, the scrubber solution passes through the system in a direction opposite the air flow direction.

The air scrubber system in accordance with one exemplary embodiment of the invention also provides for intimate mixing of water and a suitable alkaline chemical, for example, to form an aqueous scrubbing solution prior to introduction of the solution into the appropriate scrubber module. The system also provides for delivery of the aqueous scrubbing solution to the scrubber towers at a predetermined rate, adjustable within predetermined limits, in conventional fashion. Both air scrubber solution feed and chemical feed controls are preferably housed in an accessible control panel located proximate to the modules. Spent scrubbing solution is disposed of via a sewage system which forms no part of this invention per se.

In operating the air scrubber system in accordance with the exemplary embodiment, contaminated air to be treated is conveyed from a source successively through the three air scrubber towers with the aid of the blower at the outlet side of the system, where cleaned air is discharged to atmosphere via the stack. More specifically, the air is constrained to flow upwardly through the contact media of the first module, downwardly through the passageway formed in the second module adjacent the contact media to the lower portion, then upwardly through the contact media in the second module. After similar flow through the third module, the air is drawn into the outlet duct and exhausted to atmosphere.

At the same time, scrubbing solution is passed successively through the towers in the opposite direction, i.e., in a counterflow arrangement. Specifically, scrubbing solution is fed into the lower portion of the third module, spilling over into the second and first modules. Simultaneously, solution is pumped from the lower portion of each module up into the upper portion of the respective modules to be distributed across the contact media via the spray head discharge nozzles. Cleansing of the air in this exemplary embodiment occurs within the upper portion of each tower as the air flows upwardly through the contact media while scrubbing solution flows downwardly through the contact media.

In another aspect of the invention, an additional smaller contact media column is provided above the spray head assembly, in the third, or outlet module to provide demisting of the air prior to discharge to atmosphere.

Since each of the scrubbing towers is essentially identical in construction, addition or subtraction of individual towers, for increasing or decreasing scrubbing capacity, is easily accomplished.

In addition, the flow paths may be reversed or altered inlets and outlets may be changed, and contact media size and composition may be altered in accordance with job requirements with minimal effort. In addition, one or more types of scrubbing solutions or treatment fluids may be utilized, e.g., caustic or hypochlorite solution, either alone or in combination, depending on the process. In this regard, it is possible to have different treatment fluids in the same or in adjacent units. Thus, the same modules may be utilized in any number of air treatment processes, providing a degree of versatility and flexibility heretofore unavailable in the art.

Other objects and advantages will become apparent from the detailed description which follows.

BRIEF DESCRIPTION OF THE DRAWINGS

FIG. 7 is a partial plan view with access cover removed;

FIG. 8 is a schematic flow diagram illustrating the operation of the air scrubber system in accordance with one exemplary embodiment of this invention.

DETAILED DESCRIPTION OF THE DRAWINGS

Figure 2:
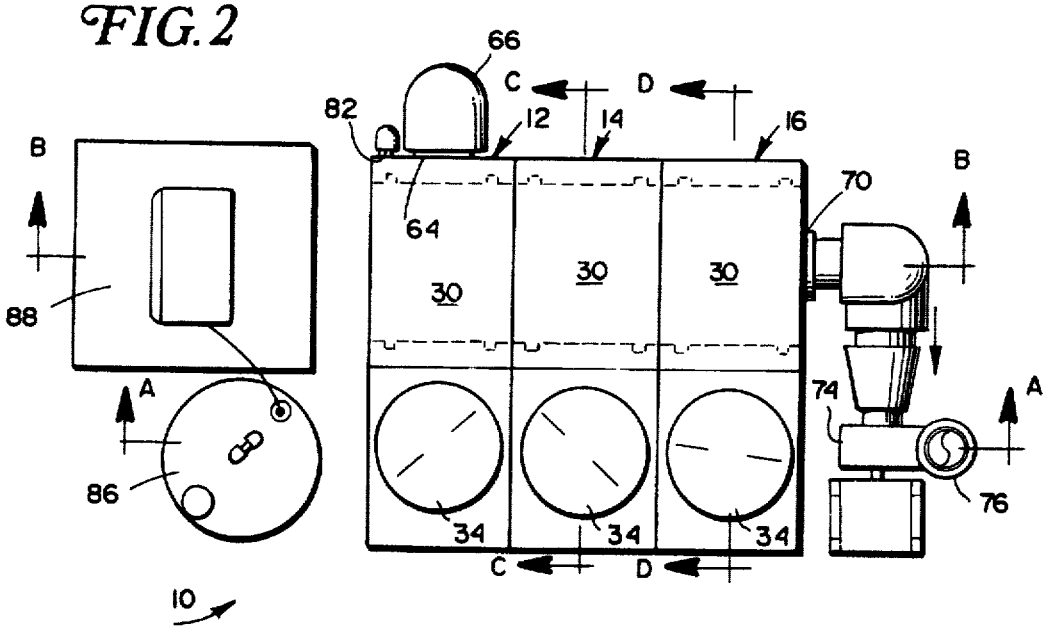
FIG. 2 is a top view of the modular air scrubber system shown in FIG. 1.
Figure 1:
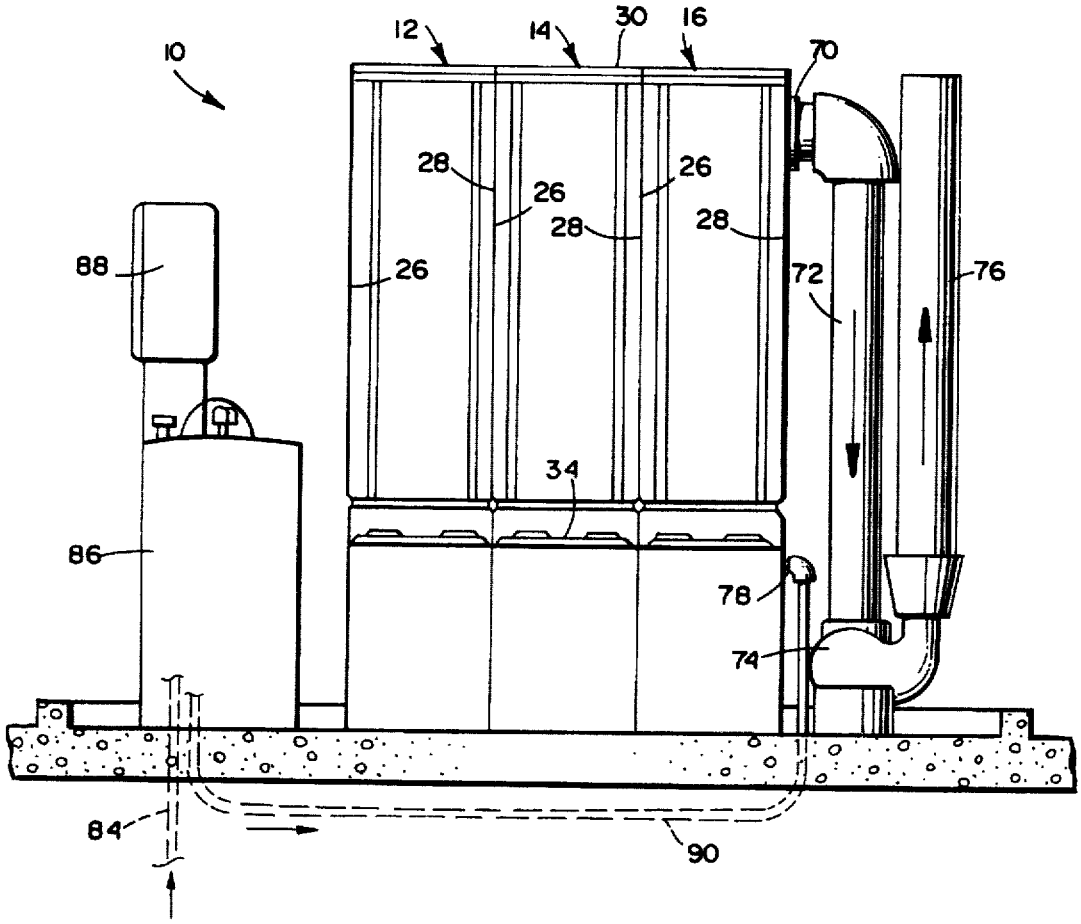
FIG. 1 is a front view of a modular air scrubber system in accordance with one exemplary embodiment of the invention.

At the outset, it is important to understand that while three scrubbing modules are shown and described in the exemplary triplex system 10 of the invention, any number of modules may be joined to effect the desired degree of air purification. For example, anywhere from one to several of the modules described herein may be utilized for a given treatment process. The triplex system described in detail herein is only one of many configurations which are within the scope of this invention.

Generally, if there are intermediate modules, such as that shown at 14 between the two end modules 12 and 16, will be identical in both exterior and interior construction. One end module is modified in certain respects in its capacity as a first, or inlet module, while the other end module is modified in other respects in its capacity as a last, or outlet module.

All of the modules have essentially the same outer wall construction as will be described in connection with module 14 below.

As best seen in FIGS. 1, 2 and 4 through 6, the modules or towers 12, 14 and 16 are substantially L-shaped in construction, and for purposes of discussion herein, the base or horizontal extension of the L-shape will be regarded as projecting in a forward direction. Accordingly, module 14 comprises a rearward vertical wall 18; an upper forward vertical wall 20 and a lower forward vertical wall 22 connected by a forward horizontal wall 24; a pair of substantially L-shaped vertical side walls 26 and 28; and a horizontal top wall 30 which, in a preferred arrangement is constructed as a removable cover. At the same time, the forward horizontal wall 24 is provided with an access opening 32 normally closed by a cover 34. The cover 34 may be of any suitable design, with a conventional screw thread or friction connection to an opening provided in the module.

Also, for convenience sake, the modules may be designated as having upper and lower portions, the upper portion extending above a horizontal plane passing through the module along the forward horizontal wall 24, and the lower portion extending below the same plane. With specific reference to FIGS. 5 and 6, an upper portion designated 36 and lower portion designated 38 extend on either side of a horizontal plane 40.

In a forward area of each lower portion 38, there is mounted a submersible pump P, preferably ½ HP, for supplying a treatment liquid to the upper portion of the respective module, as will be explained further herein.

The upper portion 36 of each module contains appropriate conventional contact media 42 supported on a perforated, preferably plastic floor 46 which is located adjacent but slightly above the plane 40.

In modules 12 and 14, the media extends in columnar form about 3 feet vertically within the upper portions of the modules, leaving substantial space above the contact media for a purpose described further below.

In the other end or outlet module 16, a first media column 48 extends approximately half the vertical distance of the upper portion 36. A second, and finer media column 50 is located in vertically spaced relationship to the first media column 48.

In the intermediate and outlet end modules 14, 16, there are provided partitions 52, 54, respectively, which extend vertically through the upper portions of the modules, from front to back, to thereby define passageways in conjunction with closely adjacent, respective sidewalls 26. At the same time, adjacent i.e., facing, sidewalls 26, 28 of modules 12, 14 and 16 are provided with aligned apertures 56 adjacent their upper ends, and establish a flow path for the air from the first to the third module. Specifically, a flow path from the upper portion of module 12 through the first pair of apertures 56 and through the passageway defined by partitions 52 and sidewall 26 of module 14 to the lower portion 38 of module 14. The air then flows upwardly through the contact media in module 14, through the second pair of apertures 56, at the interface of the second and third modules, 14, 16, and downwardly through the passageway created by partition 54 and sidewall 28 in module 16 and into the lower portion of module 16. After similar upward flow in module 16, the air is discharged as discussed in further detail below.

The lower portion 38 of each of the modules 12, 14 and 16 comprises a reservoir for a scrubbing solution S which is supplied to the contact media from above the latter. To this end, a conduit 58 extends upwardly from each pump P to a spray head assembly 60 which includes a plurality of nozzles 62 which discharge scrubbing solution onto the contact media columns 42 and 48. In the last, or outlet module 16, the spray head assembly 60 is located in the vertical space between the media columns 48 and 50.

In an exemplary embodiment of the invention, the triplex unit 10, the first or inlet module 12 is provided with an air intake 64 in its lower portion, but above the normal level of scrubbing solution therein. The air intake is connected, via a duct 66 to a wet well 68 (see FIG. 8). It will be understood that "wet well" in the context of this invention means any chamber room, tank etc., generally containing a liquid and a head space above the liquid and containing contaminated air. Examples are manholes, water treatment of sewage chambers, or other sources of noxious odors.

The last, or outlet module 16 is provided with an outlet 70 in sidewall 28 adjacent the top wall 24. The outlet connects to a duct 72 which directs the air to the inlet side of a blower 74, which in turn, exhausts the treated air into the atmosphere via a vertical stack 76.

The third module 16 is provided with a scrubber solution inlet 78 in the lower portion of sidewall 28. Openings, or spillways 80 are provided in adjacent, i.e., facing, sidewalls 26, 28 at the respective interfaces between the third and second modules 16, 14 and the second and first modules 14, 12. The first module 12 is provided with a drain 82, also in its lower portion. As can be seen best in FIG. 3, inlet 78, spillways 80 and drain 82 are located at progressively lower heights within the lower portions of the modules, thereby causing the scrubber solution to flow through the system from the third module to the first module in a direction opposite to the flow of air.

Figure 3:
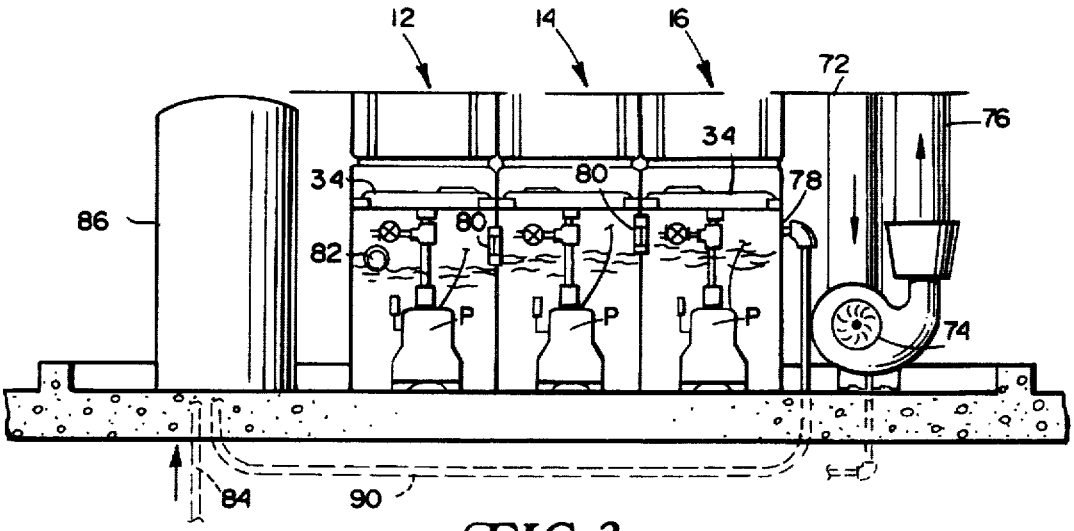
FIG. 3 is a partial front section view taken along the line A—A of FIG. 2.
Figure 4:
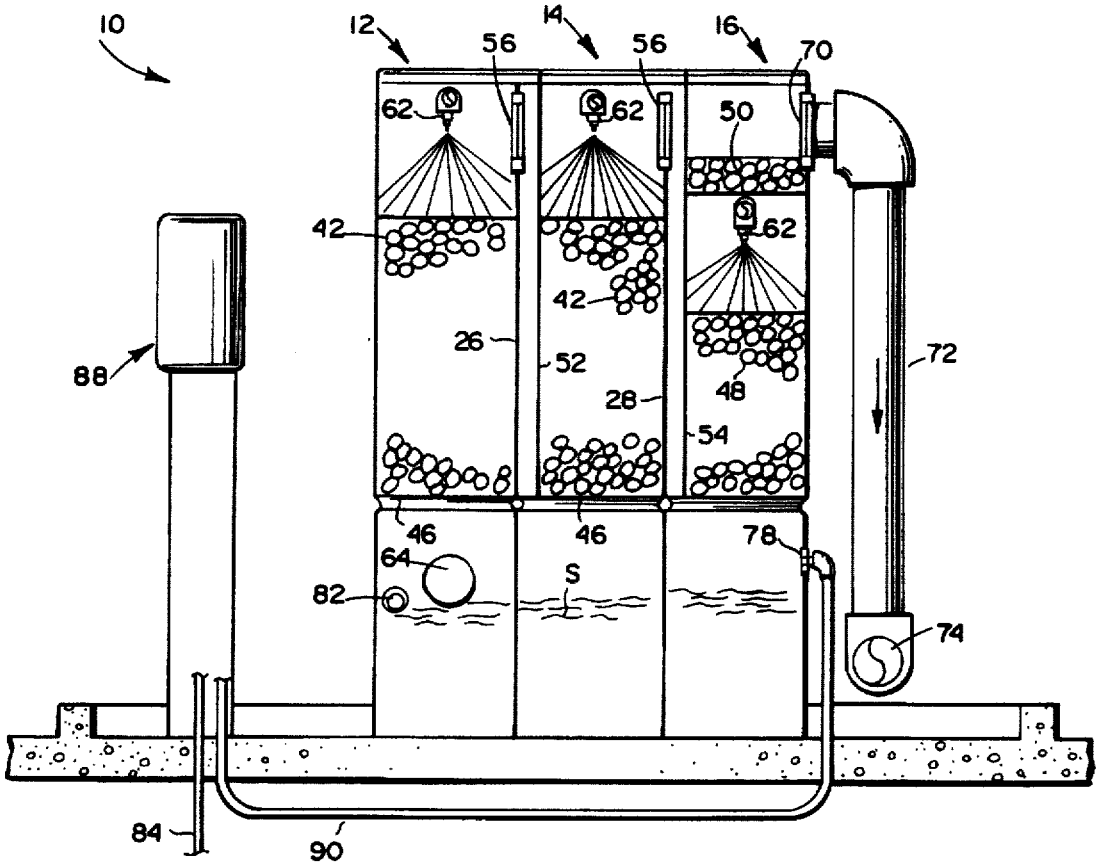
FIG. 4 is a front cross-sectional view taken along the line B—B of FIG. 2.
Figure 6:
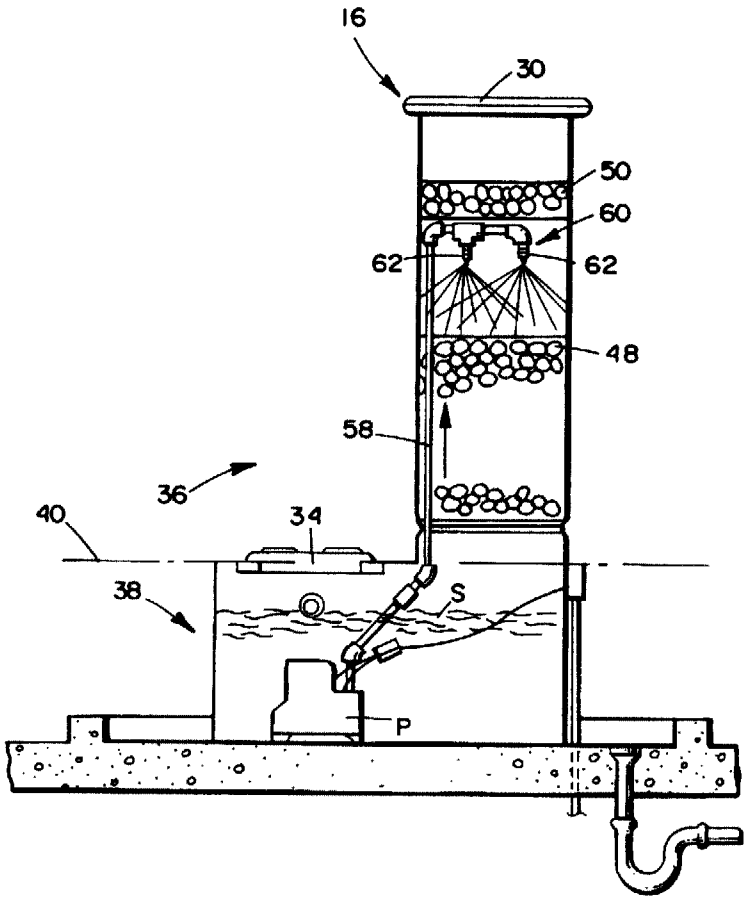
FIG. 6 is a side cross-sectional view taken along the line D—D of FIG. 2.
Figure 5:
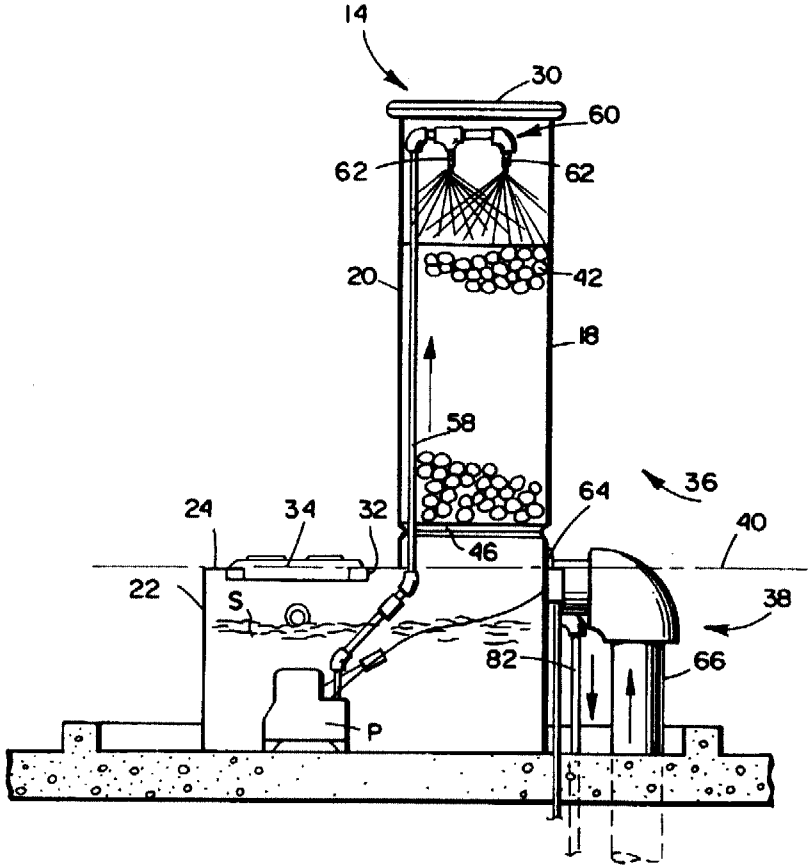
FIG. 5 is a side cross-sectional view taken along the line C—C of FIG. 2.

At the inlet side of the system, in this exemplary embodiment, a water feed inlet 84 feeds water to a control unit 88 which meters a chemical solution from scrubber storage solution tank 86 into the water at a rate determined by the degree of scrubbing treatment required. The resulting "scrubbing" solution is introduced into the lower portion 34 of the outlet module 16 via conduit 90 and inlet 78. The solution spills over into each of the adjacent modules via spillways or openings 80 (FIG. 3) until the solution reaches desired levels above the submersible pumps P but below the horizontal plane 40. Because the spillways 80 are at decreasing heights in the module walls, in a direction from the outlet side to the inlet side of the triplex unit 10 (as best seen in FIG. 3), it will be appreciated that the scrubbing solution introduced in module 16 will eventually pass to modules 14 and 12 from which spent solution is directed back to the wet well 68 via the drain 82.

In the event that more than one scrubbing solution is utilized, in combination or individually, separate feed means will be provided as required.

It will thus be appreciated that, as described, a counterflow air scrubbing system is provided, the operation of which is described further below in connection with the schematic flow diagram illustrated in FIG. 8. In an exemplary use of the triplex system 10, air contaminated with hydrogen sulfide is introduced into module 12 and caused to flow through the triplex unit under the suction provided by the blower 74. The air enters the lower portion of module 12, flows upwardly through the contact media 42, passes through the openings or apertures 56 at the interface of modules 12, 14 and flows downwardly through the chamber or passageway created between the module sidewall and the partition 52 in the module 14. The air is again caused to flow upwardly through the contact media 42 in module 14 and thereafter, through the aligned openings 56 at the interface of modules 14, 16 and downwardly into the lower portion of the last or outlet module 16, where it is caused to flow upwardly through the contact media layers 48 and 50, and out of the unit via exhaust duct 72 and stack 76 with the aid of blower 74.

At the same time, scrubbing solution in the lower reservoir portions of each module is pumped up to the respective spray head nozzles 62 for discharge onto the contact media 42 or 48 so that the upwardly flowing air is contacted by the downwardly flowing scrubbing solution. As already noted, due to the configurations of inlet 78, spillways 80 and drain 82, the scrubbing solution is caused to flow opposite the flow of air to be treated, with spent scrubbing solution drained back to the wet well 68.

In the above described arrangement, the triplex unit is capable of removing 300 ppm $H_2S$ via counter current contact of the contaminated air with an aqueous, alkaline scrubbing solution. The unit will achieve greater than 50% removal of the $H_2S$ in the first module, greater than 80% in the second module, and greater than 90% (or up to 300 ppm) in the third module.

Preferred construction details relating to the exemplary triplex system are set forth below, although the invention is not limited to such detail, which are given by way of example only.

The upper portion of each module has a volume of about 16 cubic feet, while the lower portion of each is capable of holding about 80 gallons of scrubbing solution.

Preferably, the submersible pumps P are capable of continuous operation, and are used in conjunction with standard 1" PVC plumbing and two anti-clog stainless steel nozzles 62 in the spray head assemblies 60. The pumps P have a capacity range from about 10 gallons per minute to 50 gallons per minute and a discharge pressure of up to 10 psi.

It is also preferred that the scrubber modules be made of a non-corrosive polyolefin material and that all internal scrubber components be constructed of polyolefin or stainless steel. The preferred overall dimension of the triplex unit is about 60"×50"×95". All scrubber solution feed conduits are preferably constructed of polyolefin and resistant to alkaline chemical and solution.

The scrubbing solution feed system described above is capable of providing continuous delivery of an aqueous solution to the scrubber towers at a rate normally not to exceed 1.0 gallons per minute, and adjustable via variable control flow meter to within 10% of the limit. The scrubbing solution feed system also provides for the intimate mixing of water and, for example, an alkaline chemical prior to introduction into the scrubber, via the control unit 88. The metering of the chemical solution into the feed water is accomplished preferably by the use of a bellows-type positive displacement feed pump (see FIG. 8) in the control unit with a polypropylene bellows and Kel-F inlet and outlet poppet valves.

The contaminated air is conveyed from a source of odors under vacuum preferably via a 6" diameter PVC inlet pipe to the scrubber. The clean air is exited through the blower 74 to the atmosphere, again via a 6" diameter PVC pipe. Air flow is preferably maintained between 150 and 300 cu./ft. per minute on a continuous basis by the centrifugal blower 74. The blower 74 is preferably one which operates at 1725 rpm via a shaft drive to a 115 volt, ⅓ HP electric motor. Again, it is preferred that the blower housing and internal parts thereof be constructed of polyolefin and stainless steel materials.

In a manner which will be understood by those of ordinary skill in the art, air sampling ports are provided on both sides of the system to monitor scrubber performance and air flow.

The control unit 88 is preferably constructed of fiberglass and stainless steel, while the chemical storage tank 86 is preferably constructed of polyolefin. The volume of the chemical storage tank should be designed to provide for 90 days continuous operation, but should not exceed 300 gallons.

It will be appreciated that the modular system of this invention is easily adaptable to many scrubbing processes designed for individual pollutant and air flow requirements. In other words, while the invention has been described above in conjunction with one exemplary use, i.e., the removal of $H_2S$ from contaminated air, the system may be rearranged and/or modified to provide maximum removal efficiency in many different scrubbing applications. In this regard, it is to be understood that, depending on the desired end result, a single scrubbing solution as described may be used in the modular arrangement or, different solutions (e.g., caustic and hypochlorite) may be utilized individually, or in conjunction with each other, in one or more scrubbing units. The compact design of the units allow them to be used virtually anywhere, while the utilization of polyolefin and stainless steel allow the units to withstand a variety of corrosive contaminants. This system is further designed to provide for minimal plumbing, long-life, simple operation, minimal maintenance and dependability.

The simple and uniform, self-contained module design also provides maximum flexibility in custom tailoring the modules for application to various treatment processes. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A modular air scrubber system for removal of pollutants from air comprising:

a plurality of individual scrubbing towers adapted for side-by-side interconnection and disconnection for providing multiple stage contacting of air to be treated with one or more scrubber solutions, each tower comprising a lower scrubber solution reservoir portion, a submersible pump mounted within said reservoir portion, and an upper portion containing contact media, each tower further comprising air inlet and air outlet means, and scrubber solution inlet and scrubber solution outlet means, wherein each tower comprises a substantially L-shaped housing having vertical and horizontal extensions corresponding substantially to said upper and lower portions, respectively, wherein said vertical extension is provided with a first removable cover for access to said contact media and said horizontal extension is provided with a second removable cover for access to said scrubber solution reservoir.

2. A modular air scrubber system as defined in claim 1 wherein said lower reservoir portion encloses a submersible pump.

3. A modular air scrubber system as defined in claim 1 wherein each tower further comprises means for supplying scrubber solution from said lower reservoir portion to a location in said upper portion above said contact media.

4. A modular air scrubber system as defined in claim 3 wherein said means includes a submersible pump in said lower reservoir portion and a spray discharge head in said upper portion.

5. A modular air scrubber system as defined in claim 1 and wherein said system includes at least three scrubbing towers.

6. A modular air scrubber system as defined in claim 1 and further including means for establishing counter current flow for said air and said scrubber solution.

7. A modular air scrubber system as defined in claim 1 and including means for mixing water and chemicals to provide one or more scrubber solutions.

8. A modular air scrubber system for removing pollutants from air comprising at least three stand-alone, self-contained, modular scrubber towers detachably connected in side-by-side and operative relationship, and including a first end unit, an intermediate unit, and a second end unit, each of said units including an upper portion enclosing contact media and a lower portion containing a scrubbing solution reservoir; the system further including means for introducing air to be treated into said first unit and for passing the air successively through the contact media in the first end unit, intermediate unit and second end unit; and means for simultaneously introducing a scrubber solution into the second end unit and for passing the scrubber solution successively through the contact media in the second end unit, intermediate and first end unit, wherein said means for introducing air includes an inlet in the scrubbing solution reservoir of the first end unit, but above the scrubber solution in the reservoir, and wherein said means for passing the air through the first end, intermediate, and second end unit comprises a first air opening between upper portions of the first end and intermediate units, and a second air opening between upper portions of the intermediate and second end units, and substantially vertical partitions in each of the intermediate and second end units adjacent said first and second openings.

9. A modular air scrubber system as defined in claim 8 wherein said means for introducing scrubber solution into said second end unit includes a scrubber inlet in the lower portion of the second end unit, said inlet located at a first predetermined vertical height relative to a bottom of the lower portion.

10. A modular air scrubber system as defined in claim 9 wherein said means for passing the scrubber solution across the contact media in the second end unit, intermediate unit and first end unit includes a first scrubber opening extending between lower portions of the second end and intermediate units, and a second scrubber opening extending between lower portions of the intermediate and first end units; said first and second scrubber openings being located at successively lower heights, respectively, in relation to the height of the scrubber inlet.

11. A modular air scrubber system as defined in claim 10 wherein said means for passing the scrubber solution through the contact media in the second end unit, intermediate unit and first end unit includes a submersible pump located in the lower portion of each of the scrubber units, and a spray discharge head located in the upper portion of each of the scrubber units, above the contact media, each of said submersible pumps being connected to an associated spray discharge head by a conduit.

12. A modular air scrubber system as defined in claim 8 wherein said means for passing air further includes a blower operatively connected to an air outlet conduit provided in said second end unit.

13. A modular air scrubber system as defined in claim 8 wherein each of said scrubber towers is constructed of a polyolefin material.

14. A modular air scrubber system as defined in claim 11 wherein said pumps each have a capacity of at least about 10 to about 50 gallons/min.

15. A modular air scrubber system as defined in claim 8 and further including one or more control units for mixing chemicals and water to form one or more scrubbing solutions.

16. A modular air scrubber system as defined in claim 8 wherein each tower extends vertically about 95 inches, with a front to back dimension of about 50 inches, and a side to side dimension of about 60 inches, and is constructed of non-corrosive polyolefin material.

17. A free standing, self-contained, modular scrubber tower for use in an air treatment system, said tower including an L-shaped plastic housing including an upper portion and a lower portion, the upper portion including a column of contact media, and the lower portion including a scrubber solution reservoir; a submersible pump located in said reservoir; said tower further including air inlet and outlet means, liquid inlet and outlet means, and means for discharging scrubbing solution onto said contact media for flow in a direction opposite the flow of air to be treated; said tower further including a removable cover in said upper portion for access to said contact media.

18. A scrubber tower as defined in claimed 17 wherein said discharging means comprises a conduit located within the tower, and extending between said pump and an area above said contact media, said discharging means further including at least one nozzle.

19. A scrubber tower as defined in claim 17 wherein said liquid inlet and outlet means are provided in said lower portion.

20. A scrubber tower as defined in claim 17 wherein said air outlet means is provided in said upper portion.

21. A scrubber tower as defined in claim 18 wherein said air inlet means is provided in said lower portion and said air outlet means is provided in said upper portion.

22. A scrubber tower as defined in claim 17 wherein at least one of said air and liquid inlet and outlet means are provided in said lower portion and at least another of said air and liquid inlet and outlet means is provided in said upper portion.

23. A scrubber tower as defined in claim 17 in combination with one or more control units for metering one or more scrubber solutions into said reservoir.

24. A scrubber tower as defined in claim 17 wherein the air inlet is located within an exterior wall of the scrubber solution reservoir, above a normal level of scrubbing solution to be provided therein.

25. A scrubber tower as defined in claim 17 wherein the air inlet is located in the upper portion, and wherein an air flow passageway is provided isolated from said contact media, and extending from the upper portion to the scrubber solution reservoir.

26. A scrubber tower as defined in claim 17 wherein the scrubber solution reservoir is provided with a substantially horizontally oriented access cover.

*27. A free standing, self contained modular scrubber tower for use in an air treatment system, said tower comprising a substantially L-shaped plastic housing including an upper portion and a lower portion, the upper portion including a column of contact media and the lower portion including a scrubber solution reservoir;*

*a pump for pumping scrubber solution from said scrubber solution reservoir to said upper portion by means of a conduit connected to said pump, said conduit adapted to discharge the scrubber solution onto said contact media for flow in a direction opposite the flow of air to be treated;*

*said tower further including air inlet and outlet means, liquid inlet and outlet means;*

*a first removable cover in said upper portion for access to said contact media; and*

*a second cover in said lower portion for access to said scrubber solution reservoir.*

* * * * *